United States Patent Office 3,226,475
Patented Dec. 28, 1965

3,226,475
FUNCTION GENERATORS ESPECIALLY FOR COLOUR TELEVISION RECEIVERS

William Spencer Percival, London, England, assignor to Electric & Musical Industries Limited, Hayes, England, a company of Great Britain Filed July 2, 1962, Ser. No. 206,963
Claims priority, application Great Britain, July 6, 1961, 24,498/61
18 Claims. (Cl. 178—5.4)

Figures 1, 2:
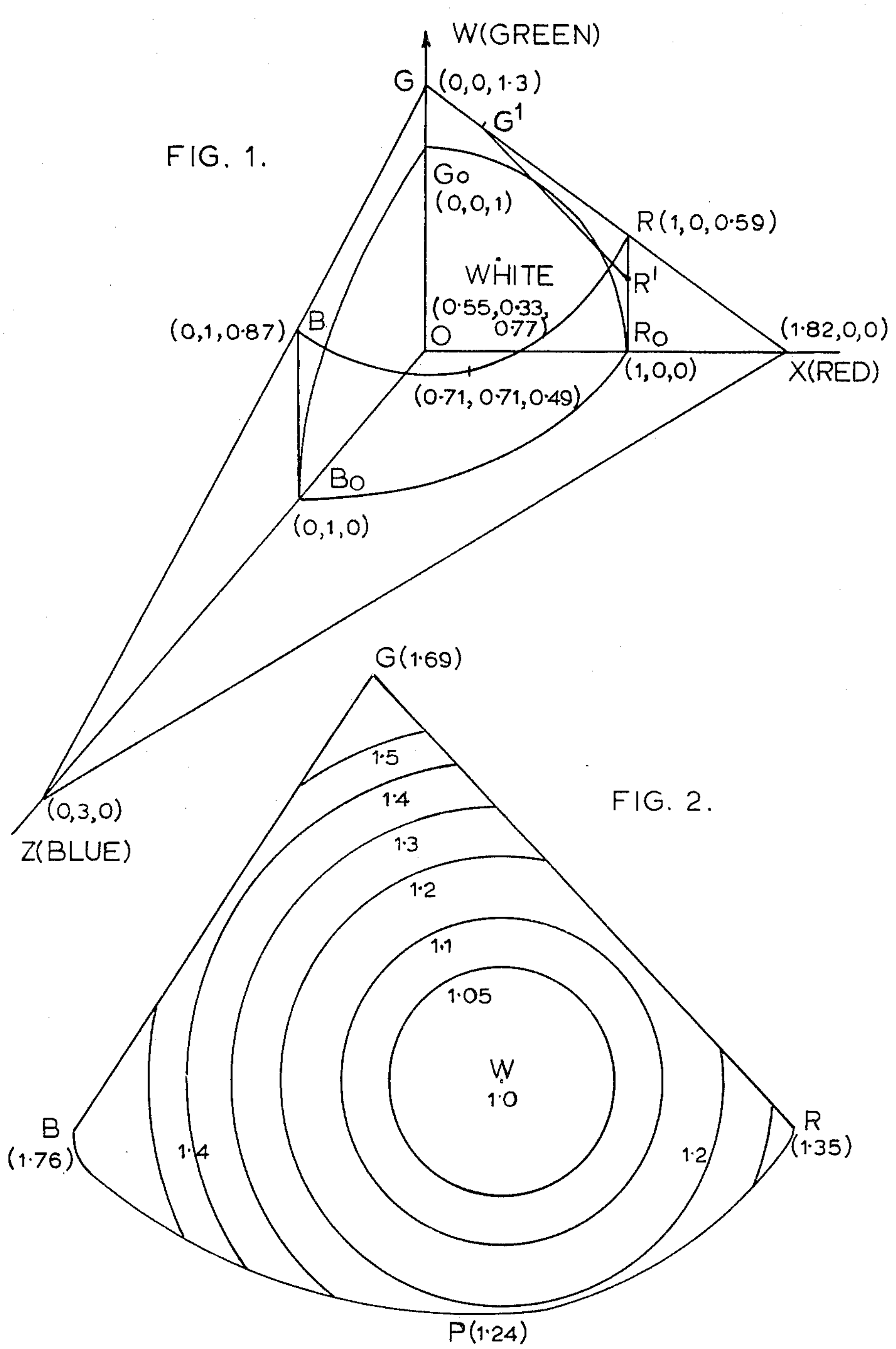

This invention relates to electrical function generators, especially for colour television receivers.

Certain advantages are to be derived in a colour television system by transmitting a video waveform comprising signal components which are of the form $$Y^{1/\gamma}=(lR+mG+nB)^{1/\gamma} \quad (4 \text{ mc./s.})$$
$$r_j=R^{1/\gamma}-Y^{1/\gamma} \quad (1.5 \text{ mc./s.})$$
$$b_j=B^{1/\gamma}-Y^{1/\gamma} \quad (0.5 \text{ mc./s.})$$

The factors 1, $m$ and $n$ are numerical co-efficients and in the following description will be taken to be 0.3, 0.59 and 0.11 respectively. Such a waveform has the advantage that it lends itself to the use of a colour television camera such that the component Y is derived from a single pick-up tube, so that it is not affected by registration errors. The gamma corrected signal $Y^{1/\gamma}$ is, moreover, that which is most suitable for reproduction in a monochrome receiver. However, the waveform has the disadvantage that if coloured picture reproduction is effected in a colour television receiver having a linear circuit for deriving the signal components which are applied to the reproducing tube, as in a receiver of N.T.S.C. type, both colour and luminance errors occur in the reproduced picture, since one at least of the signal components should be a non-linear function of the components of the received waveform.

The object of the present invention is to provide an improved electrical function generator for evaluating, to any desired degree of approximation, a non-linear function of applied signals with a view, for example, to reducing the disadvantage indicated in the preceding paragraph arising in the case of a colour television receiver.

According to the present invention there is provided an electrical function generator for approximately evaluating a non-linear function of a plurality of variables comprising linear means responsive to signals representing the bariables for simultaneously producing a series of signals respectively representing different linear approximations to the function and means for selecting the signal of extreme value produced by said linear means to derive an output signal representing the best available approximation to the non-linear function.

In the specific case of a colour television receiver according to the invention the receiver comprises means for deriving from the received waveform three signal components which are functions of the luminance and colour components of the respective scene, linear means responsive to said three signals for simultaneously producing a series of signals respectively representing different linear approximations to a non-linear function of said luminance and colour components, means for selecting the signal of extreme value produced by said linear means to derive an output signal representing the best available approximation to said non-linear function, and picture reproducing means responsive to said output signal and to some or all of said three derived signals.

Figure 3:
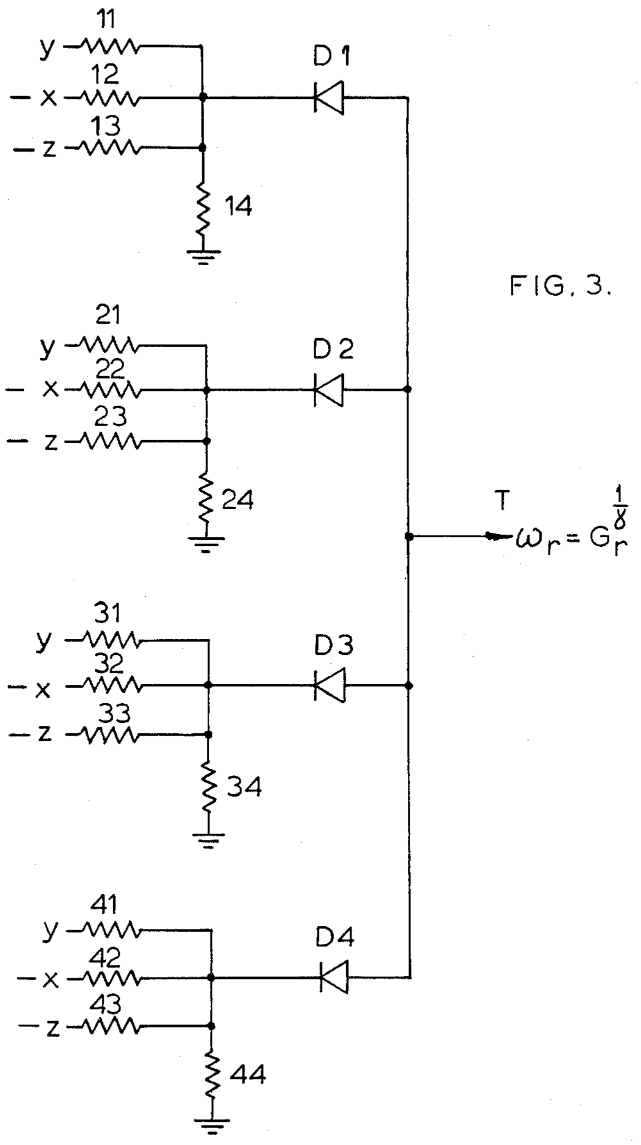
Figure 4:
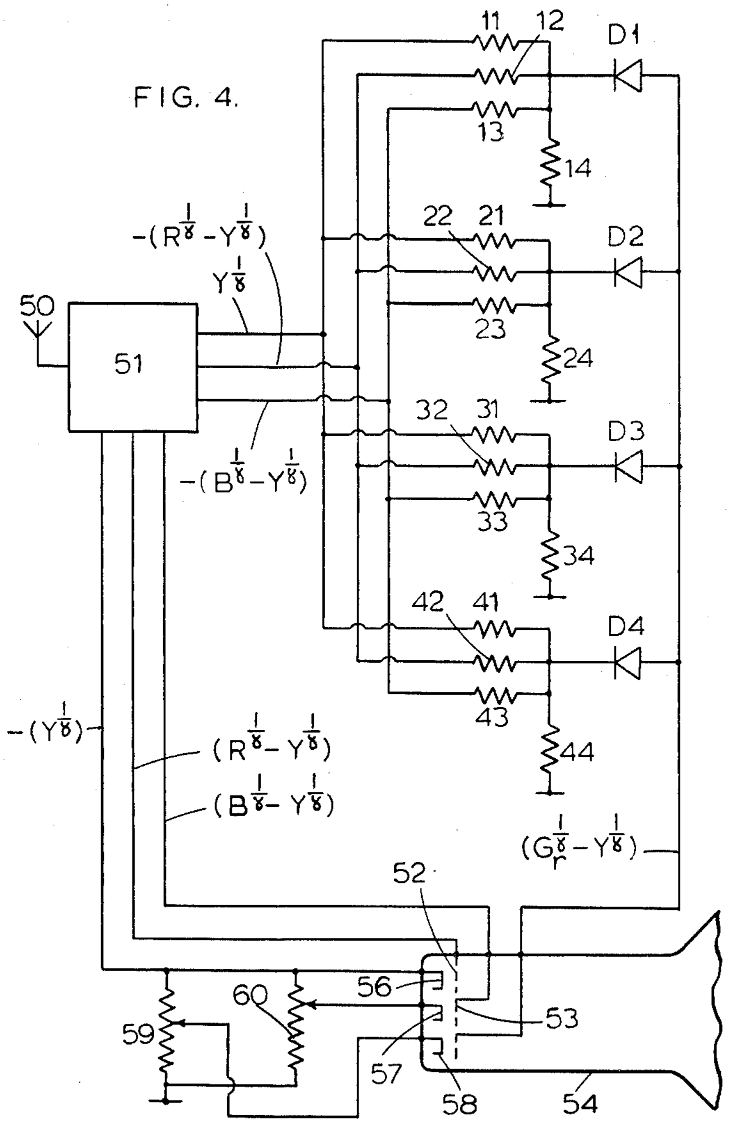

In order that the present invention may be clearly understood and readily carried into effect, it will now be described with reference to the accompanying drawings, in which:

FIGURES 1 and 2 are diagrams explanatory of the invention,

FIGURE 3 is a diagrammatic representation of a function generator, according to one example of the present invention, intended for use in a colour television receiver for deriving the signal component representing the green component of the picture to be reproduced, and FIGURE 4 illustrates diagrammatically one example of a colour television receiver according to the present invention, embodying a function generator like that shown in FIGURE 3.

In order to explain the theoretical basis of the invention, it will be assumed that a colour television receiver is required which will be able to receive a colour television signal which comprises a luminance component $Y^{1/\gamma}$ and two colour difference components $r_j, b_j$ which have the composition indicated above. For convenience let $$\frac{1}{\gamma}=\frac{1}{2}\left(\text{instead of the more usual value } \frac{1}{2.2}\right)$$

so that $$y=Y^{1/2}$$
$$x=R^{1/2}$$
$$w=G^{1/2}$$
$$z=B^{1/2}$$

$Y_r$, $R_r$, $G_r$, $B_r$=signals displayed on receiving tube expressed as equivalent voltages.

$$y_r=Y_r^{1/2}$$

and so on for $R_r$, $G_r$, $B_r$.

Let the original luminance be given by $$Y=0.3R+0.59G+0.11B \qquad (1)$$

or $$y^2=0.3x^2+0.59w^2+0.11z^2 \qquad (2)$$

For unit luminance $y=1$ and hence $$0.3x^2+0.59w^2+0.11z^2=1 \qquad (3)$$

which is the equation of an ellipsoid.

For diagrammatic purposes it is much easier to draw a sphere. Therefore let $$X^2=0.3x^2,\ W^2=0.59w^2,\ Z^2=0.11z^2 \qquad (4)$$

when $$X^2+W^2+Z^2=1 \qquad (5)$$

which is the equation of a sphere of which only with the positive octant as shown in FIGURE 1 is of interest. The surface $R_0G_0B_0$ of this octant is a surface of constant unit luminance and corresponds to the usual colour triangle.

Any point X', W', Z' within the axes represents a colour the components of which can be obtained with the aid of Equation 4, while for the luminance the following relationship always applies $$Y=X'^2+W'^2+Z'^2 \qquad (6)$$

Using this relationship, it would be possible to evaluate W' from the received signal components, but this evaluation would involve a non-linear circuit. However, a feature, of the diagram constituting FIGURE 1 is that any linear function of $x$, $w$, $z$, such as the uncorrected signal which would be produced in a normal N.T.S.C. colour television receiver or other linear receiver in response to signal components such as those under consideration is represented by a plane, while any set of linear approximations is represented by a set of planes. Hence the XWZ space is the appropriate space for representing the performance of a receiver receiving the waveform under consideration, termed the RYB waveform.

White on the octant is given by $x=1$, $w=1$, $z=1$ or $X=0.55$, $W=0.77$, $Z=0.33$. It will be convenient to take W as vertical so that white can be written as (0.55, 0.33, 0.77) as shown in FIGURE 1.

The equation to the plane tangent to the sphere $$X^2+Z^2+W^2=1 \quad (7)$$

at white is $$0.55X+0.33Z+0.77W=1 \quad (8)$$

which corresponds to $$w_r=1.7y-0.51x-0.19z \quad (9)$$

or $$G_r^{1/2}=1.7Y^{1/2}-0.51R^{1/2}-0.19B^{1/2} \quad (10)$$

where R, B and Y are correct and $G_r$ is a linear approximation to G. Reverting to the sphere, it will be seen that the approximation is correct on white and in the neighborhood of white.

It follows from Equation 8 that the tangent plane cuts the axes at $X=1.82$, $Z=3$ and $W=1.3$ as shown in FIGURE 1. However, X and Z are confined to the quadrant of the circle in which the spere cuts the XZ plane. Hence the part of the tangent plane which is used is limited by the ellipse in which this plane cuts the cylinder $X^2+Z^2=1$.

Hence the colour triangle of units luminance which is correctly represented by the octant of the sphere is actually reproduced as the projection vertically upwards of the octant on the tangent plane. This means that X (red) and Z (blue) are correct, but the green is in excess by the vertical height of the tangent plane above the sphere.

The reproduced luminance $Y_r$ is $$Y_r=0.3R+0.59G_r+0.11B \quad (11)$$

or $$Y_r=0.3x^2+0.59w_r^2+0.11z^2 \quad (12)$$

or $$Y_r=X^2+W^2+Z^2 \quad (13)$$

Hence the luminance is given by the square of the distance from the origin. The luminance on saturated green is therefore 1.69 for the assumed value $\gamma=2$. It is 1.9 for $\gamma=2.2$, which is more usual value in practice.

To obtain the luminance on saturated red, write $X=1$, $Z=0$ in Equation 8 giving $W=0.59$ so that $X=Y^2+W^2=1+0.59^2=1.35$ compared with about 1.38 for $\gamma=2.2$. Similarly, the luminance on saturated blue is 1.76 as compared with 1.83 for $\gamma=22$, for the mid point of the line of purples, $Y=1.18$ as compared with 1.23 for $\gamma=2.2$. Clearly, these discrepancies are not of such a magnitude as to invalidate methods of correction based on putting $\gamma=2$.

Since any sphere with centre O and radius greater than unity must cut the tangent plane in a circle, the contours of constant luminance on the surface RGB of FIGURE 1 are circles as shown in FIGURE 2 in which the numbers represent the luminance Y.

It should be added that the sphere with centre O will cut any plane in a circle of constant luminance so that circles of constant luminance can be drawn on any tangent plane even if it is not tangent to the sphere of unit radius. In fact, circles of constant luminance can be drawn on any plane.

The foregoing discussion shows that the linear approximation to $w_r$ represented by Equation 9 is correct if the received signals represent white and gives an acceptable approximation in the neighborhood of white. On the other hand, the error in the approximation becomes unacceptably large for saturated or nearly saturated colours. In order to reduce the errors, in the function generator about to be described, linear means are provided which simultaneously make a series of linear approximations to the value of $w_r$, the approximation in each case being that R, $G_r$ and B define a point on a particular plane which is tangent to the constant luminance function defined by the value $Y^{1/\gamma}$ contained in the received signals, or by a neighbouring value. The function generator, moreover, includes means for selecting the signal representing minimum output of the linear means, the minimum output being selected because the errors in the approximations are positive for a particular constant luminance function. Referring to Equation 9 a series of values of $w_r$ such as required can be obtained by selecting different numerical co-efficients of $y$, $x$ and $z$, the co-efficients which are used in Equation 9 being those corresponding to the plane touching the function $y$ at the point corresponding to white.

Thus the function generator according to the invention which is shown in FIGURE 3 is designed for use in a colour television receiver which includes a circuit for obtaining from the received video waveform, signal components $y_r$, $-x_r$, and $-z_r$. The function generator is arranged to produce four signals which represent four linear approximations to the correct value of $w_r$, and the function generator comprises a set of three resistors for evaluating each approximation. There are, therefore, four sets of three resistors 11, 12, 13; 21, 22, 23 and so on. Signals produced in the receivers representing $y_r$, $-x_r$ and $-z_r$ are applied as indicated via respective resistors in each set to a unilaterally conductive device individual to the particular set of resistors. The unilaterally conductive devices are diodes, which are denoted by references D1 to D4. The resistors of each set are connected to the cathode of the respective diode and the anodes of the diodes are connected to the common output terminal T, from which the green signal component is derived. Picture reproduction is obtained in response to the components $y_r$, $x_r$, $z_r$ and $w_r$ or some linear combination thereof. Resistors 14, 24 etc. are connected from the cathodes of the diodes to ground.

The resistors of each set have selected values such that the signal applied to each diode will represent a value of $w_r$ which, is related to the respective values of $-x_r$ and $-z_r$, in accordance with the equation of a plane tangent at a particular point to the constant luminance function which contains or is near to that defined by the luminance value $y_r$. The particular point is determined by the values of the resistors. The final output signal from the four diodes D1 to D4 is the minimum of the set of four values which the sets of resistors produce. One set of resistors is chosen to define the tangent plane at white to give zero error at and in the neighbourhood of white. The other sets of resistors are chosen to give a desired approximation to the octant by means of the other three planes. The particular planes together with the tangent plane at white can be chosen having regard to the relative importance of errors in a given set of circumstances.

Referring to FIGURE 1, the function generator is required to modify the figure RGB to approximate more closely to the octant $R_0G_0B_0$ of the sphere. It is convenient to think of the figure $OGRR_0B_0B$ as modeled in wood, the process of correction consisting of making appropriate planar cuts subject to the condition that a certain area round white shall be untouched. The circuit illustrated in FIGURE 3 produces the effect of three planar cuts giving an approximation to the octant by four planes.

Since the lines in the XW plane are to scale, one cut may enter along a line in this plane parallel to and below the line GR. Clearly, the lower the cut the more the errors at R and G will be reduced although, ultimately, a more serious error will be produced where the cut intersects the quadrant $G_0R_0$. A compromise is made by making the line tangent to a quadrant of radius 0.97 corresponding to a reduction of luminance of about 5%. Similar operations would be possible parallel to the line GB and below the ellipse BR. Moreover, the directions of the cuts should be such that they emerge in the plane RGB so as to form a triangle of appropriate size and shape round white.

The above procedure could be termed "cutting off the edges of the figure." Alternatively, the cuts may enter at a point so as to cut off the corners. In practice it is preferable to arrange the circuit of FIGURE 3 to produce an effect of intermediate character, with one cut entering along a line such as R'G' in the XW-plane as shown in the figure, to reduce errors between yellow and red.

Let the plane produced by the cut along the line R'G' be tangential at (0.69, 0, 0.69) to a constant luminance sphere of radius squared equal to $Y=0.95$. The equation to the tangent plane is therefore $$0.69X+0.69W=0.95 \qquad (14)$$

which is parallel to the Z-axis.

From Equation (8) the line RG must satisfy the equation $$0.55X+0.77W=1 \qquad (15)$$

giving $G'=(0.28, 0, 1.1)$; $R'=(1, 0, 0.38)$.

Substituting in Equation 14 from Equation 4 we have $$w_r=1.8y-0.714x \qquad (16)$$

which can be compared with Equation 9 for the plane tangent at white. The resistors of the set defining this plane, say 21, 22, 23 are selected in value according to this equation the resistor 22 being then omitted entirely since $z=0$.

In FIGURE 3, the input signals are shown as $y$, $-x$ and $-z$, the negative signs arising from the minus signs of $x$ and $z$ in equation such as Equation 9.

Some forms of linear colour television receivers designed to respond to the N.T.S.C. waveform, incorporate a three gun colour reproducing tube, and the video circuit of the receiver is such that a signal representing the luminance component of the scene is applied to the cathodes of all the guns, and colour difference signals are applied respectively to the control electrodes. FIGURE 4 represents a receiver of this general type, incorporating a function generator in accordance with another example of the invention so that the receiver is adapted for the reception of a waveform, the components of which are of the form given at the beginning of this specification.

According to FIGURE 4, the transmitted composite colour signal is picked up by an aerial 50 and fed to a circuit 51 similar to that in a standard N.T.S.C. receiver, in which circuit the received signals are amplified and demodulated in known manner to give a luminance component and two colour difference components. If the video waveform is as envisaged, the luminance component produced by the circuit 51 represents $Y^{1/\gamma}$ and the two colour difference components represent $$r_j=-(R^{1/\gamma}-Y^{1/\gamma}) \text{ and } b_j=-(B^{1/\gamma}-Y^{1/\gamma})$$

The red difference signal $r_j$ and the blue difference signal $b_j$ are applied directly to the grids 52 and 53 of the three gun colour reproducing tube 54 of the receiver, only a fragment of which is shown. The luminance component $Y^{1/\gamma}$ inverted relative to $r_j$ and $b_j$ so as to represent $-Y^{1/\gamma}$ is applied to the cathode 56 of the red gun in the tube 54 and to the cathodes 57 and 58 of the blue and green guns via potentiometers 59 and 60 respectively. The potentiometers allow the drive amplitudes on the three guns to be relatively adjusted. Moreover, in order to provide a green colour difference signal for application to the grid 61 of the green gun, the receiver incorporates a function generator which is similar to that shown in FIGURE 3, corresponding parts of the function generators in FIGURES 3 and 4 being denoted by the same references. In this case, however, the function generator receives three inputs which respectively represent $$Y^{1/\gamma}, -r_j=-(R^{1/\gamma}-Y^{1/\gamma})$$

and $-b_j=-(B^{1/\gamma}-Y^{1/\gamma})$, these three inputs being obtained from suitable points in the circuit 51. Moreover, in this case the resistors of the function generator are selected in magnitude so as to evaluate a set of four approximations to the correct value of $g_j=(G_r^{1/\gamma}-Y^{1/\gamma})$. As in the function generator shown in FIGURE 3, a particular resistor in one or more of the groups of three resistors may have zero value, and if necessary one or more of the inputs may be reversed in sign before application to particular sets of resistors. The theoretical basis of the function generator shown in FIGURE 4 is the same as that shown in FIGURE 3 since, if the resistances are suitably adjusted, the three inputs to the function generator can be replaced by three linearly independent functions of the inputs and the outputs can be made any linear function of the inputs.

The remainder of the television receiver which is partly shown in FIGURE 4 will not be further described as it is conventional.

The absolute values of the resistors and the keep alive current for the function generators shown in FIGURES 3 and 4 are determined by the bandwidth required for the output signal.

The function generator in accordance with the invention can also be applied to a colour television receiver where the received video waveform has components which are of the form:

$$Y^{1/\gamma}$$
$$R^{1/\gamma}-Y'$$
$$B^{1/\gamma}-Y'$$

where $$Y'=lR^{1/\gamma}+mG^{1/\gamma}+nB^{1/\gamma}$$

In this case the function generator may be used to produce an approximate value of $Y'$, for application to the cathodes of the three guns of the tube, a signal for the third grid of the three gun tube, namely $G^{1/\gamma}-Y'$ being obtained directly from the received colour difference components. The invention is, moreover, generally applicable to function generators where it is desired to obtain an approximation to a non-linear function of a plurality of variables. The number of linear approximations from which the best available selections may be made may, moreover, be different from four in any particular case, depending on the degree of approximation required.

What I claim is:

1. Colour television apparatus comprising means for setting up three signal components which together represent a coloured picture, a plurality of networks, each having input terminals to which at least the lower frequencies of respective ones of said singal components are applied and each network being arranged to produce a respective output signal which represents a different approximation to a non-linear function of the signal components applied thereto, a series of one way devices each connected from the output of a respective network to a common point so as to set up at said common point the one of said output signals which lies at an extreme of the range of values of said output signals at the time, the signal set up at said common point being the best available approximation to said non-linear function among said output signals and means for utilising at least the lower frequencies of the signal set up at said common point together with at least two of said three signal components which together represent the coloured picture.

2. A colour television receiver comprising means for setting up three signal components which are functions of the luminance and colour components of a scene, a plurality of networks responsive to at least the low frequencies of said three signals for simultaneously producing a series of signals respectively representing different approximations to a non-linear function of said luminance and colour components, means for selecting the signal of extreme value produced by said networks as an output signal representing the best available approximation to said non-linear function and picture reproducing means responsive to at least the low frequencies of said output signal and to at least two of said three signal components.

3. A television receiver according to claim 2 wherein said means for selecting the signal of extreme value comprises a plurality of one way devices each connected from a respective network to a common point, said signal of extreme value being set up at said common point.

4. A television receiver according to claim 3 wherein said one way devices comprise diodes.

5. Television apparatus according to claim 1 wherein said one way devices comprise diodes.

6. A television receiver according to claim 3 wherein said networks each produce a linear function of said three signal components.

7. Television apparatus according to claim 1 wherein said networks each produce a linear function of said three signal components.

8. A television receiver according to claim 6 wherein each of said networks comprises a resistor of selected value for each signal component connected from said setting up means to a junction point, the respective one way devices for the network being connected to said junction point.

9. Television apparatus according to claim 7 wherein each of said networks comprises a resistor of selected value for each signal component connected from said setting up means to a junction point, the respective one way devices for the network being connected to said junction point.

10. A colour television receiver comprising means for setting up a luminance signal representing $Y^{1/\gamma}$ and two colour difference signals representing $R^{1/\gamma}-Y^{1/\gamma}$ and $B^{1/\gamma}-Y^{1/\gamma}$ respectively, a plurality of networks each having input terminals to which respective ones of said signals are applied, and which networks being arranged to produce a respective output signal which is a different linear function of the signals applied thereto, the linear functions being approximations to $G^{1/\gamma}-Y^{1/\gamma}$, a series of one way devices each connected from the output of a respective network to a common point so as to set up at said common point the one of said output signals which lies at an extreme of the range of values of said output signals at the time, the signal set up at said common point being the best available approximation to $G^{1/\gamma}-Y^{1/\gamma}$ among said output signals and a reproducing tube responsive to the signals representing $Y^{1/\gamma}$, $R^{1/\gamma}-Y^{1/\gamma}$, $B^{1/\gamma}-Y^{1/\gamma}$ and $G^{1/\gamma}-Y^{1/\gamma}$.

11. A colour television receiver comprising means for setting up a luminance signal representing $Y^{1/\gamma}$ and two colour difference signals representing $R^{1/\gamma}-Y'$ and $B^{1/\gamma}-Y'$ respectively, a plurality of networks each having input terminals to which respective ones of said signals are applied, and which networks being arranged to produce a respective output signal which is a different linear function of the signals applied thereto, the linear functions being approximations to $Y'$, a series of one way devices each connected from the output of a respective network to a common point so as to set up at said common point the one of said output signals which lies at an extreme of the range of values of said output signals at the time, the signal set up at said common point being the best available approximation to $Y'$ among said output signals, means for deriving a third colour difference signal representing $G^{1/\gamma}-Y'$, and a reproducing tube responsive to the signals representing $Y^{1/\gamma}-Y'$, $R^{1/\gamma}-Y'$, $B^{1/\gamma}-Y'$ and $G^{1/\gamma}-Y'$.

12. A colour television receiver according to claim 11 wherein the linear function produced by one of said networks at least approximately represents the tangent plane to the surface defined by $Y'$ at the point corresponding to white.

13. Colour television apparatus according to claim 9 wherein the linear function produced by one of said networks at least substantially represents the tangent plane to the non-linear function at the point corresponding to white.

14. A colour television receiver according to claim 10 wherein the linear function produced by one of said networks at least approximately represents the tangent plane to the surface defined by $G^{1/\gamma}-Y^{1/\gamma}$ at the point corresponding to white.

15. A colour television receiver according to claim 8 wherein the linear function produced by one of said networks at least approximately represents the tangent plane to said non-linear function at the point corresponding to white.

16. A colour television receiver comprising a circuit for deriving from a received colour waveform a luminance signal representing the luminance of the scene and at least two gamma corrected colour related signals related to the colour of the scene, a plurality of linear networks responsive to at least the low frequency components of said luminance signal and said colour related signals for producing simultaneously a series of signals representing different approximations to a non-linear function of a luminance signal represented by $Y^{1/\gamma}$ and of said colour related signals, means for selecting the signal of extreme value produced by said networks as an output signal representing the best available approximation to said non-linear function, and picture reproducing means responsive to said luminance signal, said colour related signals, and said selected signal for reproducing a coloured picture, the non-linear function determined by said networks being arranged to reduce errors which would arise in the reproduced picture when the desired luminance signal represents $Y^{1/\gamma}$.

17. Colour television apparatus comprising means for setting up three signals which together represent a coloured picture, a plurality of networks each including a resistor for each signal connected from the setting up means to a junction point individual to the network and a one way device connected from the junction point to a common point for all the networks, the one way devices of said networks each being connected to said common point with the same polarity, thereby to set up at said common point an output signal which equal to an extreme of the values of the signals at said junction points, and means for utilising said output signal and at least two of said three signals from said setting up means.

18. A colour television receiver comprising means for deriving from a received signal three signals which together represent a coloured picture, a plurality of networks each including a resistor for each signal connected from said deriving means to a junction point individual to the network and a one way device connected from the junction point to a common point for all the networks, the one way devices of said networks each being connected to said common point with the same polarity, thereby to set up at said common point an output signal which equal to an extreme of the values of the signals at said junction points, and a picture reproducing tube responsive to said output signal and at least two of the three signals from said deriving means.

References Cited by the Examiner

UNITED STATES PATENTS

| | | | |
|---|---|---|---|
| 2,803,697 | 8/1957 | Gibson | 178—5.4 |
| 2,845,482 | 7/1958 | King et al. | 178—5.4 |
| 2,873,312 | 2/1959 | Moe | 178—5.2 |

DAVID G. REDINBAUGH, *Primary Examiner.*

ROBERT SEGAL, *Examiner.*